W. B. Parsons.
Harvester Rake.
No. 48834. Patented Jul. 18, 1865.
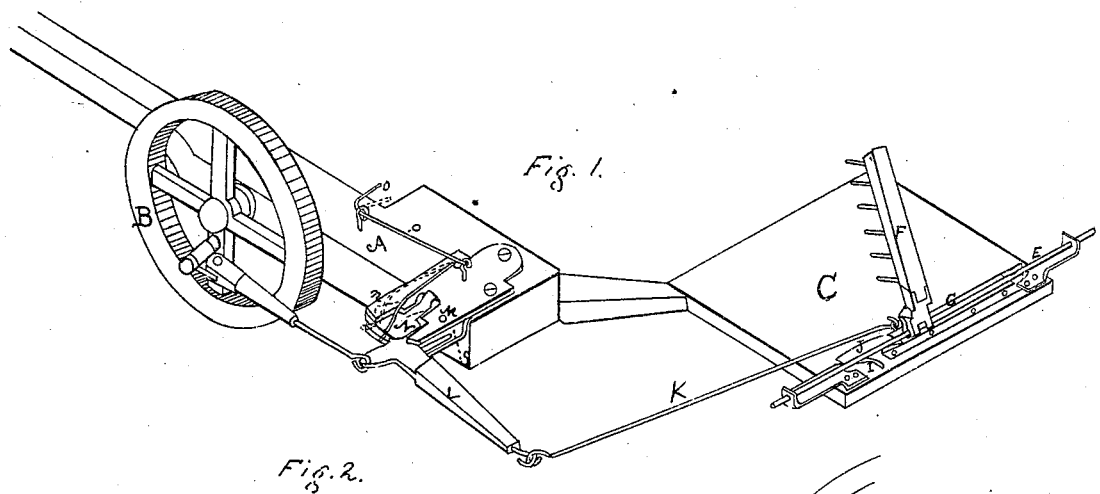
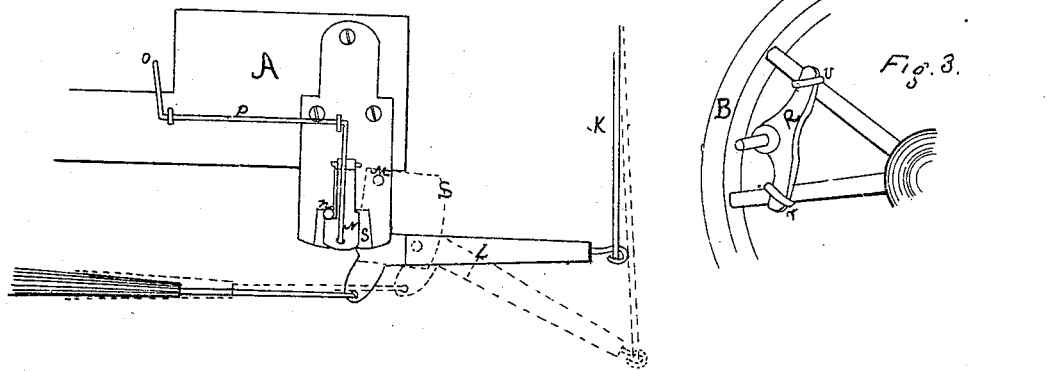
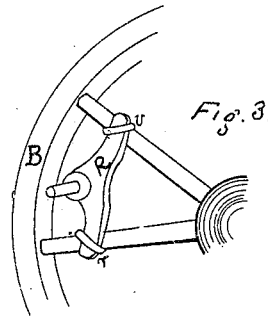
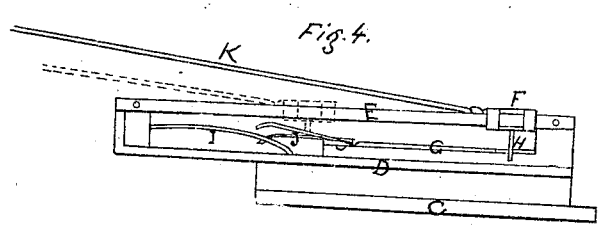
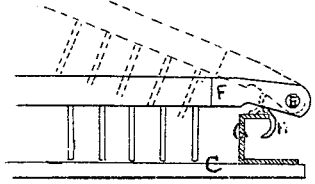
Witnesses.
P. T. Dodge
E. P. McKean
Inventor.
W. B. Parsons
By his Attys
Smith & Dodge

UNITED STATES PATENT OFFICE.

WM. B. PARSONS, OF GRANGER, NEW YORK.

IMPROVEMENT IN RAKE ATTACHMENTS TO HARVESTERS.

Specification forming part of Letters Patent No. 48,834, dated July 18, 1865.

*To all whom it may concern:*

Be it known that I, W. B. PARSONS, of Granger, in the county of Allegany and State of New York, have invented certain Improvements in Automatic Rakes for Harvesting-Machines; and I do hereby declare the following to be a full, clear, and exact description of the same, reference being had to the accompanying drawings, in which—

Figure 1 is a perspective view of my invention. Fig. 2 is a plan view of a part of the same. Fig. 3 shows a method of attaching the wrist-pin to the wheel of an ordinary machine. Fig. 4 is an elevation showing the latch arrangement which causes the rake to be raised and lowered; Fig. 5, a side elevation of the rake-head and attachments.

The nature of my invention consists in a peculiar construction of an automatic rake for harvesting-machines, which may with facility be attached to any of the machines in common use. It also consists in a novel construction of the shipping devices, whereby the rake may be rendered operative or inoperative, as desired.

That others may understand the nature and construction of my invention, I will particularly describe it.

A is the main frame of the machine, B is the driving-wheel, and C is the platform.

Upon the platform C, I mount the frame D, Fig. 4. This frame consists of the guide-rod E, secured at its ends in proper supports. Upon this rod is mounted the rake F, a cap on the end of F having suitable holes through which the rod E is inserted.

In front of and attached to the frame D is the table G, upon which the hook H rides when the rake is raised up to return over the cut grain, as shown in Fig. 1 and in red in Fig. 5. The rake moves a little farther than the end of the table G, so that the hook H will pass over the end thereof and fall down, bringing the teeth upon the platform, in which condition the rake is drawn and the gavel removed from the platform. As the rake traverses the platform and reaches its inner edge, so that the gavel falls from it, the hook H comes in contact with the inclined piece I and slides up its surface, causing the rake to be raised up, as shown in Fig. 1, and raises the latch J, as shown in blue, Fig. 4, which falls again when the hook has passed it, so that when the rake returns the latch J takes the hook upon its upper surface and conducts it to the top of the table G, and so on.

The rake is operated by the rod K connecting it to the lever L, which forms a rock-shaft, as shown, and is in turn connected by a wrist to the driving-wheel of the machine, as shown in Fig. 1. The wrist-pin, being set in a slot in one of the spokes of the driving-wheel, may be fixed at a point nearer or farther from the center, so as to give a longer or shorter stroke to the lever and consequently a longer or shorter sweep to the rake; or, if it be not convenient to arrange the adjustability in that way, it may be accomplished in any other of the well-known methods.

It is necessary to provide some means by which the rake may be prevented from operating at the will of the attendant; and in order to accomplish this the rock-shaft L is not pivoted to the frame of the machine, but is pivoted to another part or block, S, which is in turn pivoted to the frame of the machine at M, Figs. 1 and 2. This secondary piece S is maintained in place by the latch N and pin $n$, the latter being attached to the block S and the former to the frame. The attendant, by pressing his foot upon the lever O of the rock-shaft P, raises the latch N, as shown in red in Fig. 1, and the pin $n$ and block to which it is attached are thereby released and allowed to swing freely on the pin M. This it will inevitably do as the pitman is pushed back by the revolution of the driving-wheel, and will swing out, as shown in red in Fig. 2, and return again when the pitman recedes, and so on each stroke or revolution of the driving-wheel. The friction necessary to overcome in moving the rake F while supported by the hook H upon the table G being necessarily greater than the friction in simply swinging the block to which the rock-shaft L is pivoted, and as the resistance to the motion of the rake is exerted through the long lever of L, it appears obvious that the block to which L is pivoted will simply swing on its pivot instead of pushing the rake, and this fact has been substantiated by actual trial. When the driver removes his foot from the lever O the latch N falls to its place and engages with the pin $n$, so that the lever L operates the rake at the next stroke. By this arrangement the rake is completely under the control of the attendant, and when the grain is thin the quantity cut during two or three revolutions of the driving-wheel may be gathered into one gavel.

When it is desired to attach my improvement to a machine already constructed or in use, when it may not be convenient or possible to attach the wrist-pin in the manner spoken of above, I use the method shown in Fig. 3, the wrist-pin being connected to a plate, R, which is laid across two of the spokes of the wheel and secured to them by the straps r, or in any other convenient way. This plate may be moved nearer or farther from the hub at pleasure, thus lengthening or shortening the stroke of the pitman.

When, owing to the construction of the platform of any machine, the frame D, as shown in Fig. 4, would not allow sufficient movement of the rake, I apply extension-pieces to support the ends of the rod E, as shown in Fig. 1.

Having described my invention, what I claim as new, and desire to secure by Letters Patent, is—

1. The block S, in combination with the rock-shaft L, operated and operating substantially as described.

2. The latch N, in combination with the block S, substantially as and for the purpose set forth.

WM. B. PARSONS.

Witnesses:
W. C. DODGE,
M. P. CALLAN.